United States Patent
Haga

(10) Patent No.: US 8,321,617 B1
(45) Date of Patent: Nov. 27, 2012

(54) METHOD AND APPARATUS OF SERVER I/O MIGRATION MANAGEMENT

(75) Inventor: Futoshi Haga, Cupertino, CA (US)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 13/110,748

(22) Filed: May 18, 2011

(51) Int. Cl.
H05K 7/10 (2006.01)
G06F 15/173 (2006.01)

(52) U.S. Cl. ............ 710/302; 710/3; 710/38; 710/305; 710/316; 709/223; 709/224; 709/238; 709/239; 370/216

(58) Field of Classification Search .................. None
See application file for complete search history.

(56) References Cited

U.S. PATENT DOCUMENTS

| | | | |
|---|---|---|---|
| 6,286,066 B1* | 9/2001 | Hayes et al. ................ 710/302 |
| 7,350,014 B2* | 3/2008 | Kapoor et al. ................ 710/308 |
| 7,639,624 B2* | 12/2009 | McGee et al. ................ 370/248 |
| 7,782,869 B1* | 8/2010 | Chitlur Srinivasa ..... 370/395.41 |
| 7,783,788 B1* | 8/2010 | Quinn et al. ..................... 710/8 |
| 7,840,398 B2* | 11/2010 | Zimmer et al. ................ 703/23 |
| 7,840,706 B1* | 11/2010 | Abdulla et al. .............. 709/245 |
| 8,078,764 B2* | 12/2011 | Okitsu et al. .................... 710/5 |
| 2003/0221001 A1* | 11/2003 | Moran et al. ................. 709/224 |
| 2004/0215864 A1* | 10/2004 | Arimilli et al. .............. 710/302 |
| 2005/0080923 A1* | 4/2005 | Elzur ........................... 709/238 |
| 2005/0125590 A1 | 6/2005 | Li et al. |
| 2005/0270988 A1 | 12/2005 | DeHaemer |
| 2005/0281191 A1* | 12/2005 | McGee et al. ................ 370/216 |
| 2006/0004837 A1* | 1/2006 | Genovker et al. ............ 707/102 |
| 2006/0018263 A1* | 1/2006 | McGee et al. ................ 370/241 |
| 2006/0101185 A1* | 5/2006 | Kapoor et al. ................ 710/308 |
| 2007/0025253 A1* | 2/2007 | Enstone et al. .............. 370/235 |
| 2008/0080400 A1* | 4/2008 | Kapoor et al. ................ 370/255 |
| 2008/0114781 A1* | 5/2008 | Yin et al. ....................... 707/100 |
| 2008/0147937 A1* | 6/2008 | Freimuth et al. ............. 710/104 |
| 2008/0222661 A1* | 9/2008 | Belyakov et al. ............. 719/321 |
| 2009/0198862 A1* | 8/2009 | Okitsu et al. ................. 710/316 |
| 2009/0327462 A1* | 12/2009 | Adams et al. ................. 709/222 |
| 2010/0115174 A1* | 5/2010 | Akyol et al. .................. 710/316 |
| 2010/0211717 A1* | 8/2010 | Uehara et al. ................ 710/316 |
| 2010/0232443 A1* | 9/2010 | Pandey ......................... 370/401 |
| 2010/0257349 A1* | 10/2010 | Lee ................................. 713/2 |
| 2011/0268120 A1* | 11/2011 | Vobbilisetty et al. ........ 370/392 |

OTHER PUBLICATIONS

'Using HP ProLiant Network Teaming Software with Microsoft® Windows® Server 2008 Hyper-V or with Microsoft® Windows® Server 2008 R2 Hyper-V' HOWTO, 4th Edition, by HP, copyright 2010.*
VMware's White Paper 'NIC Teaming IEEE 802.3ad,' copyright 2003 by VMware, Inc.*
'Implementing the Advanced Switching Fabric Discovery Process,' by Robles-Gomez et al., copyright 2007, IEEE.*

(Continued)

*Primary Examiner* — Steven Snyder
(74) *Attorney, Agent, or Firm* — Hitachi America, Ltd.

(57) ABSTRACT

In an information system, for I/O migration, the migration management module detects a first I/O function associated with a first I/O device to which the OS is connected, selects a second I/O function associated with a second I/O device which is the same type of the first I/O device, and instructs to hot-add the second I/O function to the OS. And the OS sets a teaming for a first virtual MAC address of a first virtual NIC corresponding to the first I/O function and a second virtual MAC address of a second virtual NIC corresponding to the second I/O function, and disconnects the first virtual MAC address of the first virtual NIC corresponding to the first I/O function.

18 Claims, 12 Drawing Sheets

OTHER PUBLICATIONS

'I/O Virtualization and Sharing—PCI-SIG IO Virtualization' by Michael Krause and Renato Recio, copyright 2006 by Microsoft Corporation.*

'PCI Express and Advanced Switching: Evolutionary Path to Building Next Generation Interconnects' by David Mayhew and Venkata Krishnan, from 11th Symposium on High Performance Interconnects, 2003.*

'PCI Express Base Specification' Revision 1.0a, Apr. 15, 2003.*

'PCI Hot-Plug Specification' Revision 1.1, Jun. 20, 2001.*

'Advanced Switching: a new take on PCI Express' by Rooholamini, Intel Corp., from Oct. 14, 2004, www.EDN.com.*

'Multi Root I/O Virtualization . . . and its Potential to consolidate I/O Infrastructures' by Bernhard Schrader, copyright Fujitsu Siemens Computers Nov. 2, 2008.*

* cited by examiner

| Function ID | Function Type | Device ID | Attached Host ID | Attached Compute System ID | Connected NW Domain ID | Assigned Band Width | Used Band Width | Assigned Device Address |
|---|---|---|---|---|---|---|---|---|
| FN001 | FC-HBA | Dev001 | Host001 | Com001 | Domain001 | 4Gbps | 4Gbps | 01:23:45:67:89:00 |
| FN002 | FC-HBA | | | | | | | - |
| FN003 | FC-HBA | Dev002 | Host002 | Com002 | Domain001 | 4Gbps | 4Gbps | 01:23:45:67:89:02 |
| FN004 | FC-HBA | | Host002 | Com002 | Domain001 | 4Gbps | 4Gbps | 01:23:45:67:89:03 |
| FN005 | NIC | | | | | | | - |
| FN006 | NIC | | | | | | | - |
| FN007 | NIC | Dev003 | Host003 | Com002 | Domain002 | BE | 8Gbps | 0a:0b:0c:0d:0e:00 |
| FN008 | NIC | | | | | | | - |
| FN009 | NIC | Dev004 | Host004 | Com003 | Domain002 | BE | 2Gbps | 0a:0b:0c:0d:0e:02 |
| FN010 | NIC | | | | | | | - |
| FN011 | NIC | | Host005 | Com003 | Domain003 | BE | 1Gbps | 0a:0b:0c:0d:0e:04 |
| FN012 | NIC | | Host005 | Com003 | Domain003 | BE | 1Gbps | 0a:0b:0c:0d:0e:05 |

I/O Function Management Table 1200

Fig.2

| I/O Device ID | I/O Device Port ID | Connected NW Switch ID | Connected NW Port ID | Inserted I/O Switch ID | Connectable Compute Systems | Physical Band Width | Available Band Width |
|---|---|---|---|---|---|---|---|
| Dev001 | IOPort001 | NWSW001 | NWPort002 | IOSW001 | Com001, Com002, Com003 | 10Gbps | 2Gbps |
| Dev002 | IOPort001 | NWSW002 | NWPort003 | IOSW001 | Com001, Com002, Com003 | 10Gbps | 6Gbps |
| Dev003 | IOPort001 | NWSW001 | NWPort002 | IOSW002 | Com001, Com002, Com003 | 10Gbps | 0Gbps |
| Dev004 | IOPort001 | NWSW002 | NWPort003 | IOSW002 | Com001, Com002, Com003 | 10Gbps | 8Gbps |

1300 — I/O Device Management Table

Fig.3

| NW Switch ID | NW Switch Port ID | Connectable NW Domain IDs |
|---|---|---|
| NWSW001 | NWPort001 | Domain001 |
| | NWPort002 | Domain001, Domain002 |
| | NWPort003 | Domain001 |
| | NWPort004 | Domain002 |
| NWSW002 | NWPort001 | Domain002, Domain003 |
| | NWPort002 | Domain002, Domain003 |
| | NWPort003 | Domain002 |
| | NWPort004 | Domain003 |

Network Switch Management Table 1400

1401 — NW Switch ID
1402 — NW Switch Port ID
1403 — Connectable NW Domain IDs

Fig.4

| 1501 | 1502 | 1503 | 1504 |
|---|---|---|---|
| Host ID | Host Type | Compute System ID | Connected NW Domain IDs |
| Host001 | Bare | Com001 | Domain001, Domain002 |
| Host002 | VM | Com002 | Domain001, Domain002 |
| Host003 | VM | Com002 | Domain002, Domain003 |
| Host004 | VM | Com003 | Domain002, Domain003 |
| Host005 | VM | Com003 | Domain002, Domain003 |

Host Management Table

METHOD AND APPARATUS OF SERVER I/O MIGRATION MANAGEMENT

BACKGROUND OF THE INVENTION

The present invention relates generally to storage systems and, more particularly to methods and apparatus of server I/O migration management.

Recently, Information Technology (IT) platform has been utilizing new I/O switch devices such as Peripheral Component Interconnect (PCI) Express (PCI-e) switch. PCI-e switch increases I/O flexibility to server systems compared with the on-board or normal PCI I/O devices. By using the PCI technologies, a server system can communicate with other server, storage and network systems after they are configured correctly.

U.S. Patent Publication No. 2005/0125590 A1 discloses an inside implementation of PCI-e switch. And U.S. Patent Publication No. 2005/0270988 A1 discloses a method to configure PCI-e switch connections.

However, these patent publications and the standards for the PCI technologies do not specify the I/O management method for the PCI-e switch although the PCI-e switch has a potential to increase dynamical flexibility to server systems. If many I/O traffics concentrate to one particular I/O device, it is hard to control these traffic behaviors.

BRIEF SUMMARY OF THE INVENTION

Exemplary embodiments of the invention provide one of I/O switches comprises I/O migration management feature, and a server management system comprises a virtual server management feature and an I/O teaming management feature. The I/O migration management feature has the capability to manage I/O functions on I/O devices, and to configure connections between I/O functions and hosts such as Operation System (OS) or Virtual Machine Monitor (VMM) in the managed compute systems. The virtual server management feature has the capability to manage virtual I/O configurations on VMM and Virtual Machine (VM). The I/O teaming management feature has the capability to manage I/O teaming configurations on OS and VMM.

In accordance with an aspect of the present invention, an information system comprises An information system for I/O migration comprising; a managed computer executing an OS (Operation System); an I/O switch having plurality of I/O devices coupled with the managed computer via a network; and a migration management module, wherein the migration management module: detects a first I/O function associated with a first I/O device to which the OS is connected, selects a second I/O function associated with a second I/O device which is the same type of the first I/O device, and instructs to hot-add the second I/O function to the OS, wherein the OS: sets a teaming for a first virtual MAC address of a first virtual NIC corresponding to the first I/O function and a second virtual MAC address of a second virtual NIC corresponding to the second I/O function, and disconnects the first virtual MAC address of the first virtual NIC corresponding to the first I/O function. This invention is used to provide more efficient server I/O configuration when if IT platform system uses I/O switch migration management.

These and other features and advantages of the present invention will become apparent to those of ordinary skill in the art in view of the following detailed description of the specific embodiments.

BRIEF DESCRIPTION OF THE DRAWINGS

FIG. 2 shows an example of I/O function management table.

FIG. 3 shows an example of I/O device management table.

FIG. 4 shows an example of network switch management table.

FIG. 5 shows an example of host management table.

DETAILED DESCRIPTION OF THE INVENTION

Figure 1:
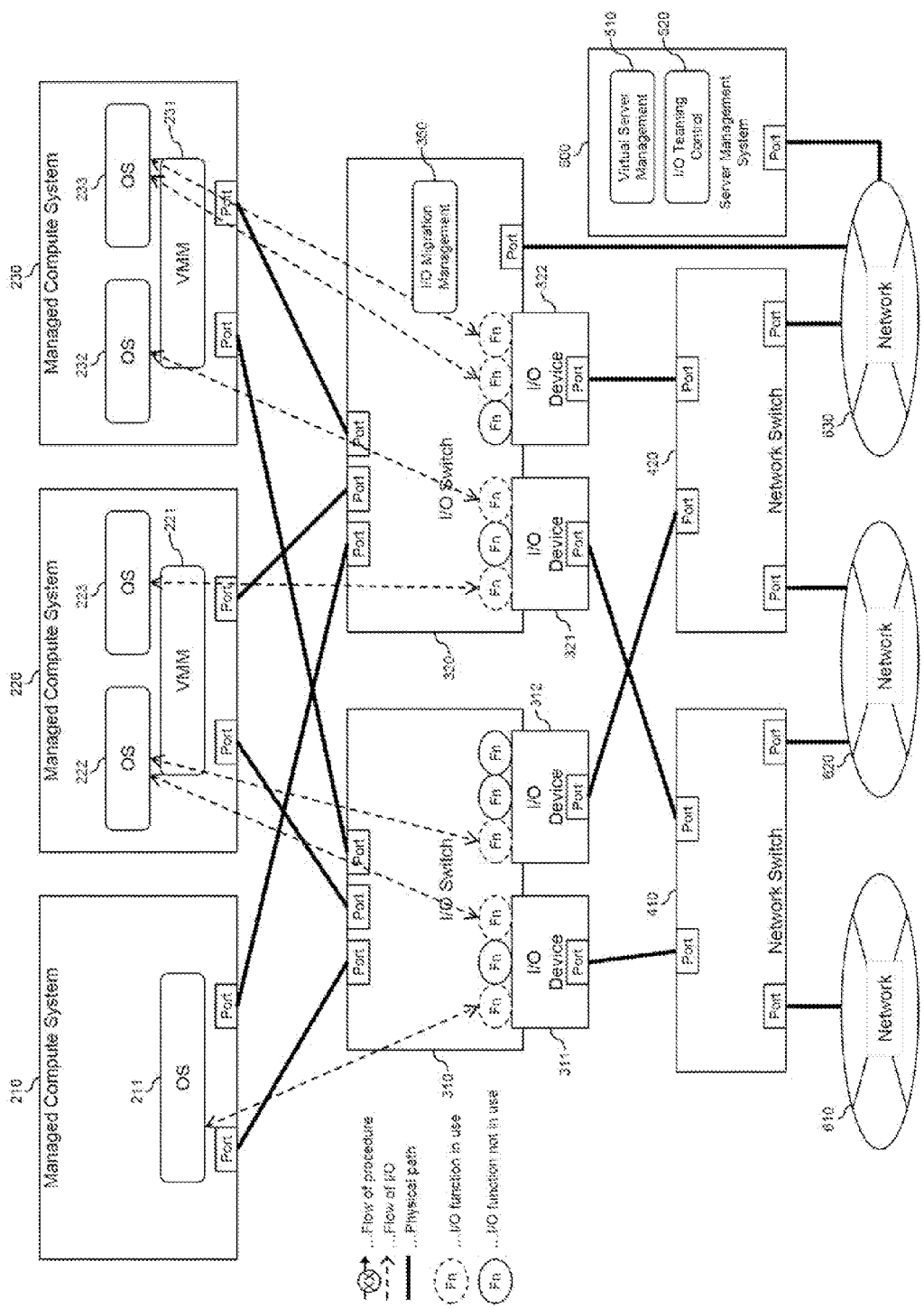
FIG. 1 shows an example of a system configuration of a server system.

In the following detailed description of the invention, reference is made to the accompanying drawings which form a part of the disclosure, and in which are shown by way of illustration, and not of limitation, exemplary embodiments by which the invention may be practiced. In the drawings, like numerals describe substantially similar components throughout the several views. Further, it should be noted that while the detailed description provides various exemplary embodiments, as described below and as illustrated in the drawings, the present invention is not limited to the embodiments described and illustrated herein, but can extend to other embodiments, as would be known or as would become known to those skilled in the art.

Reference in the specification to "one embodiment," "this embodiment," or "these embodiments" means that a particular feature, structure, or characteristic described in connection with the embodiment is included in at least one embodiment of the invention, and the appearances of these phrases in various places in the specification are not necessarily all referring to the same embodiment. Additionally, in the following detailed description, numerous specific details are set forth in order to provide a thorough understanding of the present invention. However, it will be apparent to one of ordinary skill in the art that these specific details may not all be needed to practice the present invention. In other circumstances, well-known structures, materials, circuits, processes and interfaces have not been described in detail, and/or may be illustrated in block diagram form, so as to not unnecessarily obscure the present invention.

Furthermore, some portions of the detailed description that follow are presented in terms of algorithms and symbolic representations of operations within a computer. These algorithmic descriptions and symbolic representations are the means used by those skilled in the data processing arts to most effectively convey the essence of their innovations to others skilled in the art. An algorithm is a series of defined steps leading to a desired end state or result. In the present invention, the steps carried out require physical manipulations of tangible quantities for achieving a tangible result. Usually, though not necessarily, these quantities take the form of electrical or magnetic signals or instructions capable of being stored, transferred, combined, compared, and otherwise manipulated. It has proven convenient at times, principally for reasons of common usage, to refer to these signals as bits, values, elements, symbols, characters, terms, numbers, instructions, or the like. It should be borne in mind, however, that all of these and similar terms are to be associated with the appropriate physical quantities and are merely convenient labels applied to these quantities.

Unless specifically stated otherwise, as apparent from the following discussion, it is appreciated that throughout the description, discussions utilizing terms such as "processing," "computing," "calculating," "determining," "displaying," or the like, can include the actions and processes of a computer system or other information processing device that manipulates and transforms data represented as physical (electronic) quantities within the computer system's registers and memories into other data similarly represented as physical quantities within the computer system's memories or registers or other information storage, transmission or display devices.

The present invention also relates to an apparatus for performing the operations herein. This apparatus may be specially constructed for the required purposes, or it may include one or more general-purpose computers selectively activated or reconfigured by one or more computer programs. Such computer programs may be stored in a computer-readable storage medium, such as, but not limited to optical disks, magnetic disks, read-only memories, random access memories, solid state devices and drives, or any other types of media suitable for storing electronic information. The algorithms and displays presented herein are not inherently related to any particular computer or other apparatus.

Various general-purpose systems may be used with programs and modules in accordance with the teachings herein, or it may prove convenient to construct a more specialized apparatus to perform desired method steps. In addition, the present invention is not described with reference to any particular programming language. It will be appreciated that a variety of programming languages may be used to implement the teachings of the invention as described herein. The instructions of the programming language(s) may be executed by one or more processing devices, e.g., central processing units (CPUs), processors, or controllers.

Exemplary embodiments of the invention, as will be described in greater detail below, provide apparatuses, methods and computer programs for I/O migration management.

System Configuration

FIG. 1 shows an example of a system configuration of a server system. It comprises managed compute system 210, 220, 230, I/O switch 310, 320, I/O device 311, 312, 321, 322, network switch 410, 420, server management system 500, network 610, 620, 630. Managed compute system 210, 220, 230 has a capability to execute a OS 211 and OS 222, 223, 232, 233 via a VMM (Virtual Machine Manager) 221, 231 as a host computer, and connected to the I/O switch 310, 320. VMM 221, 231 is a server virtualization platform, and has a capability to execute OS 222, 223, 232, 233, and create virtual I/O functions from I/O functions and assign them to OS.

OS 211, 222, 223, 232, 233 has a capability to connect to one or more I/O functions, and communicate with other OS and IT systems such as storage systems and client systems via network. I/O switch 310, 320 has a capability to provide I/O functions on I/O devices 311, 312, 321, 322. I/O function is a virtual NIC (Network Interface Card) or virtual HBA (Host Bus Adapter) which are connected to I/O switch 310, 320, and the I/O switch provides connectivity between I/O functions and OS 211 and VMM 221, 231 via the PCI-e network or other network protocol. Each OS 211, 222, 223, 232, 233 can connect to one or more networks 610, 620, 630 via I/O functions which processed in the I/O switch 310, 320.

I/O switch 320 comprises a module of I/O migration management 350. I/O migration management 350 may be implemented as one of the functions of server management system 500 and may be provided by a software module processed by a microcomputer/micro integrated chip and/or by a hardware module like micro integrated circuits. I/O migration management 350 has a capability to manage I/O migration process of this system by cooperate with server management system 500 via network 630. The I/O migration management 350 may be implemented in the I/O switch 310, 350, and instructed from the Server Management System 500. But it may be implemented in an external I/O computer separately from the I/O Switch 310, 350.

I/O devices 311, 312 are connected with I/O switch 310, and I/O devices 321, 322 are connected with I/O switch 320. Each I/O device 311, 312, 321, 322 has a capability to provide one or more I/O functions to each I/O switch 310, 320. And I/O devices 311, 321 are connected to a network switch 410, and also I/O devices 312, 322 are connected to a network switch 420.

Server management system 500 comprises a module of virtual server management 510 and a module of I/O teaming control 520. The virtual server management 510 and I/O teaming control 520 may be provided by a software module and/or by a hardware module like micro integrated circuits. Server management system 500 is connected to the network 630, and has connections among I/O switches 310, 320, and managed compute systems 210, 220, 230. Virtual server management 510 has a capability to manage VMM 221, 231 via network 630. I/O teaming control 520 has a capability to manage network teaming configurations on OS 211, 222, 223, 232, 233 and VMM 221, 231 via network 630.

Network switch 410, 420 provide connectivity between each I/O device 311, 312, 321, 322 and network 610, 620, 630. With these connections, each component in this system can communicate with each other. Network 610, 620, 630 provide connectivity between each network switch 410, 420 and server management system 500. And also, it is omitted but other IT systems such as storage systems and client systems are connected with these networks.

Tables for I/O Migration Management

FIG. 2 shows an example of I/O function management table in the I/O Migration Management 350. It comprises function ID 1201, function type 1202, device ID 1203, attached host ID 1204, attached compute system ID 1205, connected network (NW) domain ID 1206, assigned band width 1207, used band width 1208, and assigned device address 1209. Function ID 1201 is identifiers of each I/O function in I/O switches 310, 320. Function type 1202 shows type of each I/O function such as network interface card (NIC) or fiber-channel host bus adaptor (FC-HBA), and so on.

Device ID 1203 is identifiers of each I/O device 311, 312, 321, 322. Attached host ID 1204 shows that which host (OS 211 or VMM 221, 231) is attached to each I/O function by identifier of host. Attached compute system ID 1205 shows that which managed compute system 210, 220, 230 is attached to each I/O function by identifier of managed compute system. Connected network domain ID 1206 shows that which network 610, 620, 630 is connected to each I/O function by identifier of network.

Assigned band width 1207 shows that how much band width is assigned to each I/O function. BE in the Assigned band width 1207 stands for best effort. Used band width 1208 shows that how much band width is used by each I/O function. These values may be real-time monitored and the average value of the particular team may be calculated by I/O switch 310, 320 or I/O device 311, 312, 321, 322.

Assigned device address 1209 shows device address of each I/O functions, such as media access control (MAC) address or world wide name (WWN).

FIG. 3 shows an example of I/O device management table. It comprises I/O device ID 1301, I/O device port ID 1302, connected network switch ID 1303, connected network port ID 1304, inserted I/O switch ID 1305, connectable compute systems 1306, physical band width 1307, available band width 1308. I/O device ID 1301 shows identifier of each I/O device 311, 312, 321, 322. I/O device port ID 1302 shows identifier of each port of I/O device 311, 312, 321, 322. Connected network switch ID 1303 shows that which network switch 410, 420 is connected each I/O device 311, 312, 321, 322.

Connected network port ID 1304 that shows which port of network switch 410, 420 is connected each I/O device 311, 312, 321, 322. Inserted I/O switch ID 1305 shows that which I/O switch 310, 320 each I/O device 311, 312, 321, 322 is inserted. Connectable compute systems 1306 shows that which managed compute system 210, 220, 230 can be connected with each I/O device 311, 312, 321, 322 via I/O switch 310, 320. Physical band width 1307 shows the total band width which each I/O device 311, 312, 321, 322 has. Available band width 1308 shows the not in use band width of each I/O device 311, 312, 321, 322.

FIG. 4 shows an example of network switch management table. Network switch management table 1400 comprises network switch ID 1401, network switch port ID 1402, and connectable network domain IDs 1403. Network switch ID 1401 is identifier of each network switch 410, 420. Network switch port ID 1402 is identifier of each port on each network switch 410, 420. Connectable network domain IDs 1403 shows that which network each network switch 410, 420 can be connected to.

FIG. 5 shows an example of host management table 1500. The table comprises host ID 1501, host type 1502, compute system ID 1503, and connected network domain IDs 1504. Host ID 1501 is identifier of each host (OS 211, 222, 223, 232, 233). Host type 1502 shows the type of environment that host is installed. The "Bare" means the host is installed on a physical compute system, and the "VM" means the host is installed on a virtual machine. Compute system ID 1503 shows the identifier of managed compute system which the host is installed. Connected network domain IDs 1504 shows the one or more network 610, 620, 630 which the host is connected via I/O switch 310, 320.

Flow Chart for I/O Migration Management

Figure 6:
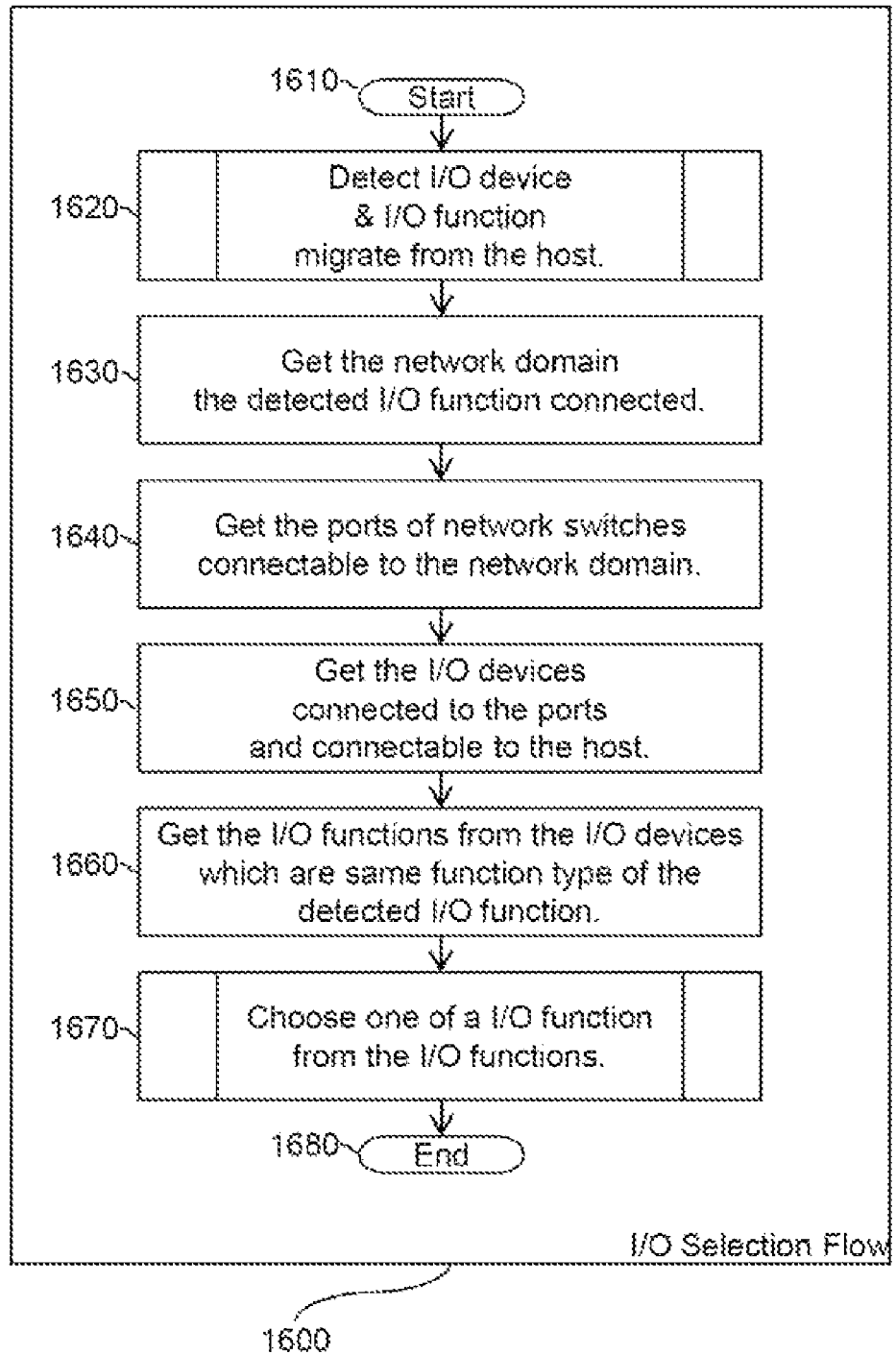
FIG. 6 shows an example of a flow diagram illustrating the I/O selection flow of the I/O migration management 350.
Figure 7:
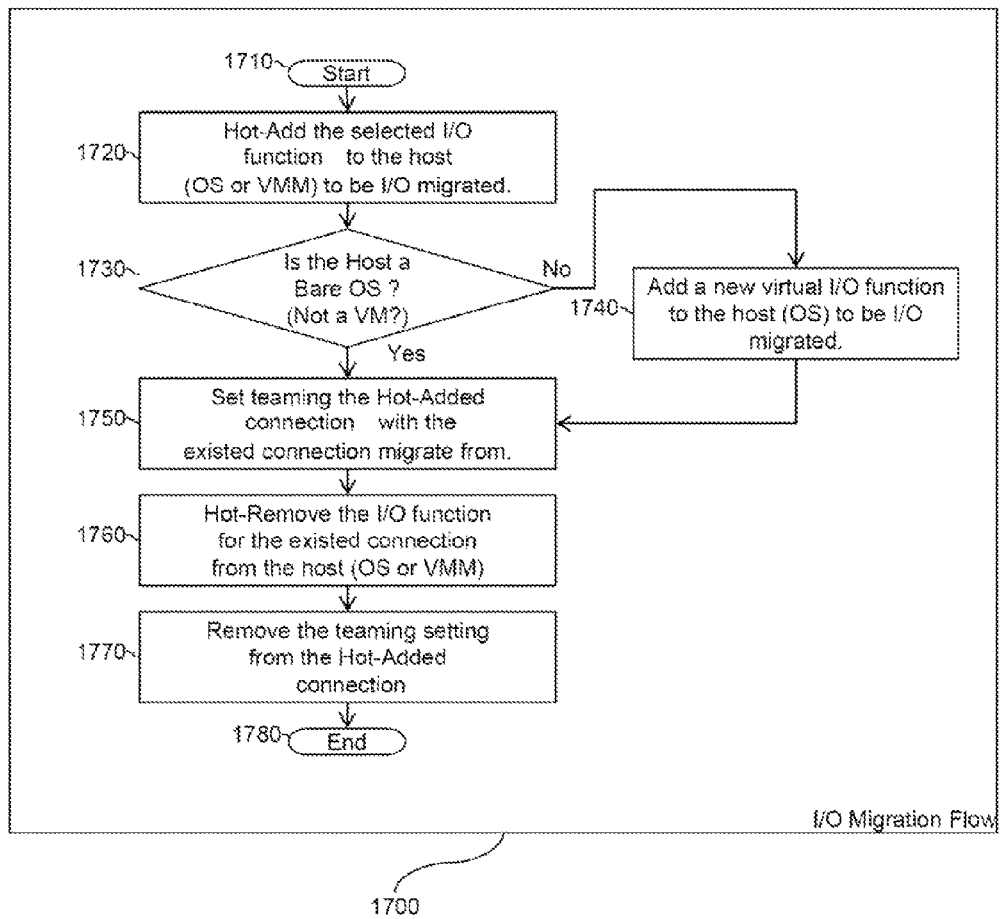
FIG. 7 shows an example of a flow diagram illustrating the I/O management flow of the I/O migration management 350.

FIG. 6 shows an example of flow diagram illustrating the I/O selection flow 1600 of the I/O migration management 350. FIG. 7 shows an example of a flow diagram illustrating the I/O management flow 1700 of the I/O migration management 350. When an I/O connection of a host is migrated, at first, the I/O selection flow 1600 is processed, and after that, the I/O migration flow 1700 is processed. I/O selection flow 1600 is started by operation of server management system 500 or external system of this system such as integrated management system (Step 1610).

At first, I/O migration management 350 detects the selected I/O function on an I/O device 311, 312, 321, 322 which is migrated from a host (Step 1620). This I/O function is specified by operator or external system, or it may be detected by I/O migration management 350 itself, based on the available band width 1308. After detect the I/O function which migrate to, I/O migration management 350 gets the network domains which the detected I/O function is connected to, based on the Connected network domain ID 1206 (Step 1630). And I/O migration management 350 gets the ports of network switches which are connected to that network domain, based on network switch management table 1400 (Step 1640).

I/O migration management 350 selects one or more I/O device 311, 312, 321, 322 which is connected to that ports and the host of which I/O function is migrated to, based on connected network port ID 1304 with connected network switch ID 1303, and connected network domain IDs 1540 (Step 1650). And from the selected I/O devices, I/O migration management 350 gets one or more I/O function of which type is the same as the detected I/O function, based on function type 1202 (Step 1660).

At last, I/O migration management 350 selects one I/O function from that got I/O functions (Step 1670). This I/O function is selected by I/O migration management 350 randomly, or selected based on the available band width 1308. When selecting the one I/O function associated with an I/O device, the I/O migration management 350 may select the I/O function which has the same domain to the old existing I/O function, using the information from table in the FIG. 3, and FIG. 4. From FIG. 3, I/O migration management 350 detect the Connected Network (NW) Switch ID 1303 and Port I/D 1304 witch connected to I/O device the I/O function on. After that, from FIG. 4, I/O migration management 350 detects the Connectable NW Domain IDs 1403 with that Connected NW Switch ID 1303 and Port I/D 1304. The network domain of the old existing I/O functions may be contained this detected connectable domains.

I/O migration flow 1700 is started by I/O migration management 350 itself, after I/O selection flow 1600 is finished. At first, I/O migration management 350 Hot-Adds the I/O function, which is selected on the I/O selection flow 1600, to the host (OS 211, or VMM 221, 231) of which I/O connection is migrated to (Step 1720). After that, this flow divides into two branches depend on which the host is bare OS 211 or OS 222, 223, 232, 233 on a VMM 221, 231 (Step 1730), it is detected based on the host type 1502. If the host is not a bare OS 211 but a OS 222, 223, 232, 233 (Step 1730: No), VMM should create a virtual I/O function from the Hot-Added I/O function, and configure the virtual I/O function which the host can use (Step 1740). Hot-add functions allow to add additional virtual hardware to running virtual machines without reboot or shutdown of the computer.

After that, to bare OS 211 or virtual I/O function added OS 222, 223, 232, 233, the teaming is set for I/O connections which are a new created connection by Hot-Add Steps 1720-1740, and an existing connection which is migrated from the host (Step 1750). After teaming is set, I/O migration management 350 Hot-Removes the I/O function for the existing connection which is set teaming on Step 1750, from the host (Step 1760). At last, after Hot-Remove is finished, the teaming setting which is set 1750 is removed from the host (Step 1770).

Sequence Diagram for I/O Migration Management

Figure 8:
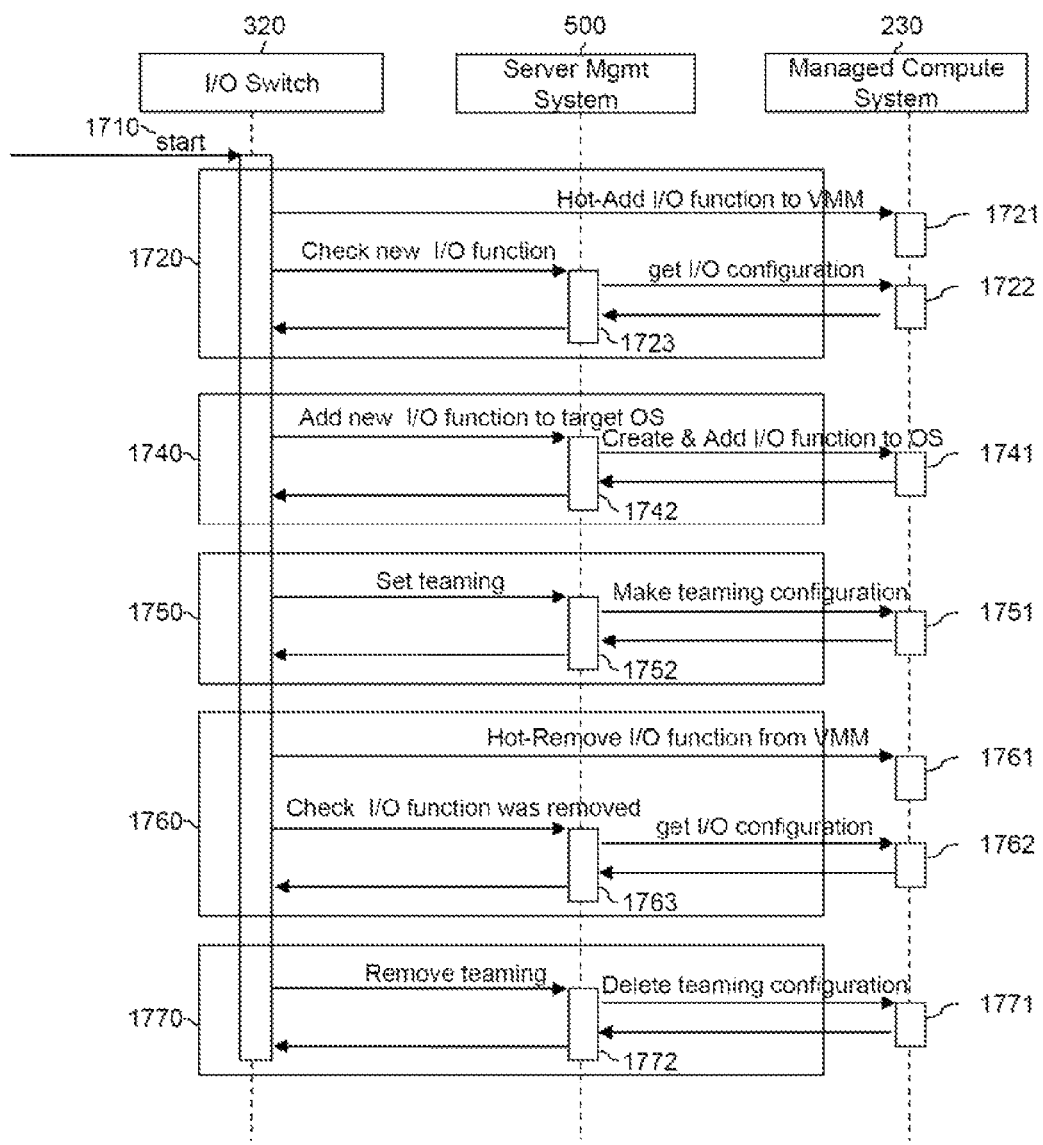
FIG. 8 shows an example of a sequence diagram of the I/O migration management 350.

FIG. 8 shows an example of sequence diagram of the I/O migration management 350. The sequence describes control-flows among I/O switch 320, server management system 500, and managed compute system 210, 220, 230, in the I/O migration flow 1700. The Hot-Add flow is described in step 1720. I/O migration management 350 send the interruption date, including the information of the selected I/O function, to the host via the network in order to hot-add the selected I/O function to the OS, and the network may be PCI-e network. Then the virtual I/O function, like virtual NIC and MAC address, are generated on the VMM (Step 1721). After Hot-Add operation step 1721, I/O migration management 350 in I/O switch 320 sends requests to check the result of the Hot-Add is successfully completed or not, to server management system 500 (Step 1723).

To make response to this request, the server management system 500 gets I/O configuration from the I/O Hot-Added host (Step 1722). At the flow in step 1740, by the request from I/O migration management 350, the server management system 500 creates and adds a virtual I/O function to host on VMM in managed compute system 230 (Step 1741, Step 1742). More specifically, the server management system 500 instructs the creation of the virtual I/O function (virtual NIC and MAC address) on VM (Virtual Machine) and/or VMM and instructs the recognition of the created virtual I/O function to OS on the VM and/or VMM, n the managed computer system. The VMM and/or VM associates the virtual NIC on the VM with the virtual NIC on the VMM. If the host is a bare OS without the VM, the step 1740 is skipped.

The flow in step 1750, by the request from I/O migration management 350, the server management system 500 sets teaming to the host in the managed compute system 230 (Step 1751, Step 1752). More specifically for the teaming, The OS generates virtual MAC (address) and associates the virtual MAC on the OS with the old MAC address of the old virtual NIC in the VM and/or VMM, and associates the virtual MAC on the OS with the newly created MAC address of the newly created virtual NIC on the VM and/or VMM. After the teaming process, the OS may treat plurality of the virtual NIC as one NIC.

The Hot-Remove flow is described in step 1760. The I/O migration management 350 instructs the hot-remove of the old I/O function to the host in the managed computer system 230. By the instruction, the VMM and/or VM remove the old virtual NIC and MAC from them. As a result, OS has a connection via newly created I/O function (virtual NIC and MAC) instead of the removed old I/O function (virtual NIC and MAC). After Hot-Remove step 1761, the I/O migration management 350 checks the steps are successfully executed or not (Step 1762, Step 1763). And remove teaming flow in step 1770 is the same as step 1740 and step 1750, by the request from I/O migration management 350, the server management system 500 deletes teaming configuration from the host in managed compute system 230 and the host disconnect the connection to the old I/O function (Step 1771, Step 1772). Hot-remove functions allow to remove the additional virtual hardware from running virtual machines without reboot or shutdown of the computer. By the teaming of the old and newly added I/O functions, the OS may continue the communication to the target when the old I/O function is hot-removed.

System Behavior on I/O Migration

Figure 9:
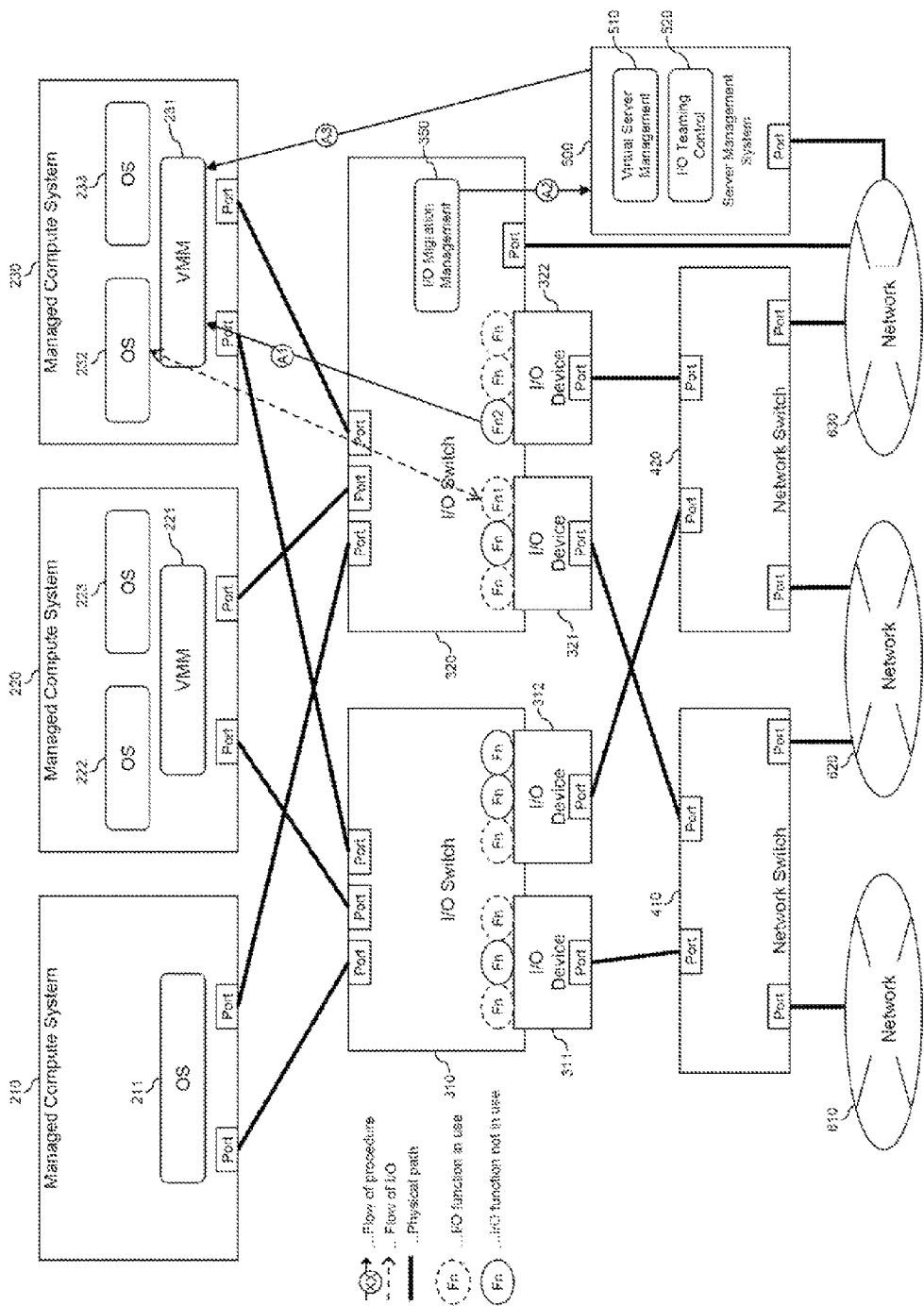
FIG. 9 shows an example of a system behavior in Hot-Add flow of the I/O migration.

FIGS. 9-12 show examples of system behaviors in I/O migration. Some flows of I/Os which are not picked up here may be omitted. FIG. 9 shows an example of system behavior in Hot-Add flow from step 1720 to step 1750. I/O migration management 350 makes one of I/O functions on the I/O device 322 (creates Fn2), which has not been used, the I/O migration management instructs the Hot-Add to the VMM 231 (A1) as step 1720. Result check for Hot-Add step 1723, virtual I/O configuration step 1742, and teaming setting step 1752 are requested from the I/O migration management 350 to the server management system 500 (A2) as steps 1740, 1750. To execute these requests, server management system 500 controls OS, VM and/or VMM on the managed compute system (A3).

In the PCI protocol, including PCI-e, after the I/O migration management 350 sends the interruption data to the OS in the managed computer system, the response to the interruption data is not returned to the I/O migration management 350 by the PCI protocol. Accordingly, the migration management 350 may not recognize whether the interruption data is correctly processed or not. And if the inconsistency occurred between the managed computer and I/O switch, the system may be failed. Thus, the result check for Hot-Add step 1723, virtual I/O configuration step 1742, and teaming setting step 1752 should be requested from the I/O migration management 350 via the server management system 500 (A2 and A3).

Figure 10:
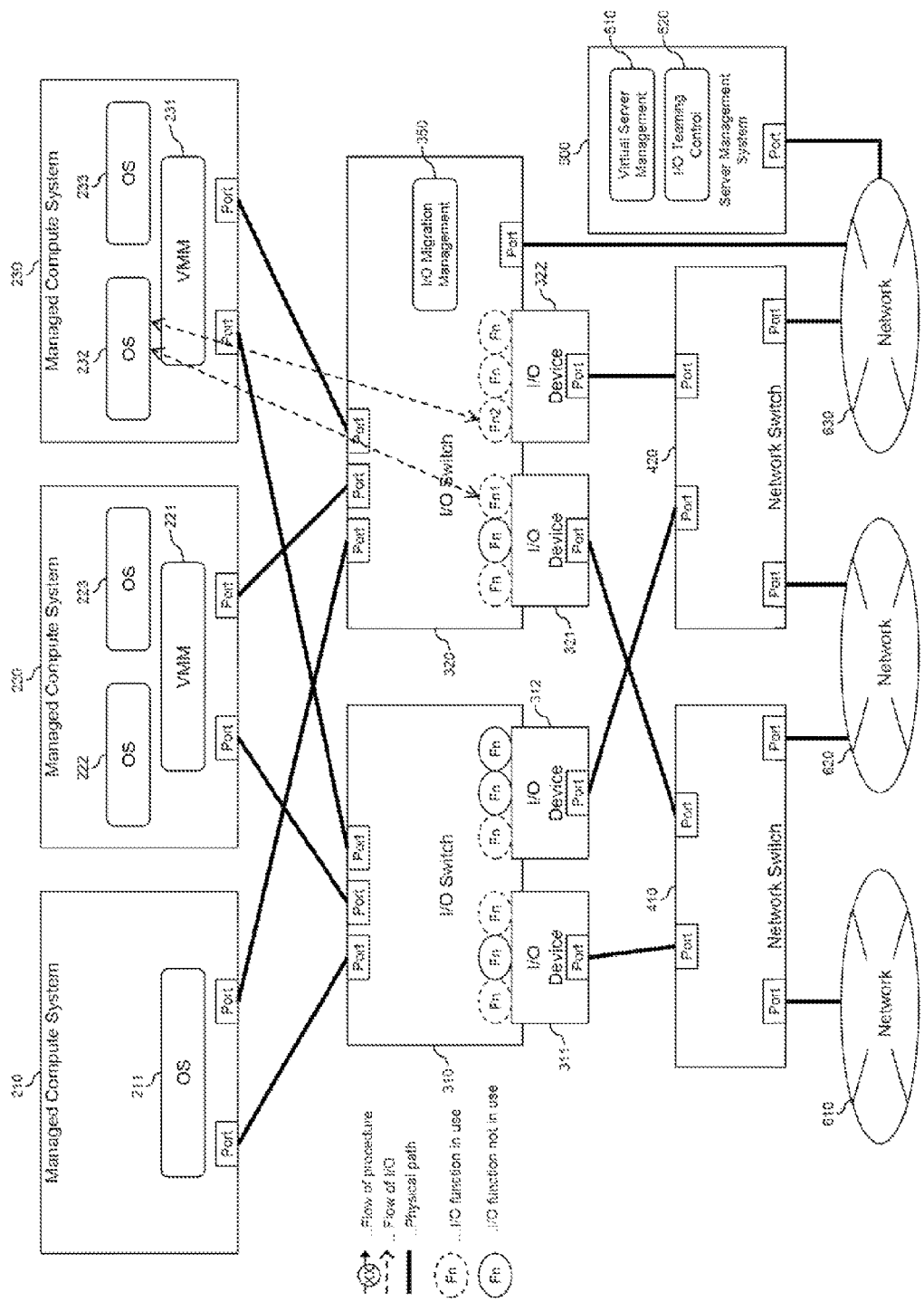
FIG. 10 shows an example of a system behavior before Hot-Remove flow of the I/O migration.

FIG. 10 shows an example of system state before Hot-Remove operation step 1760. In this figure, the OS 232 has connected to I/O device 321 via old (already existing) I/O function, Fn1. And by the above described flow in the FIG. 9, the I/O switch creates new I/O function Fn2 on the I/O device. Both of the newly added I/O function Fn2 and the old (existing) I/O function Fn1 connect to the OS 232. After teaming operation 1750, the OS 232 can communicate with its targets via both of I/O functions.

Figure 11:
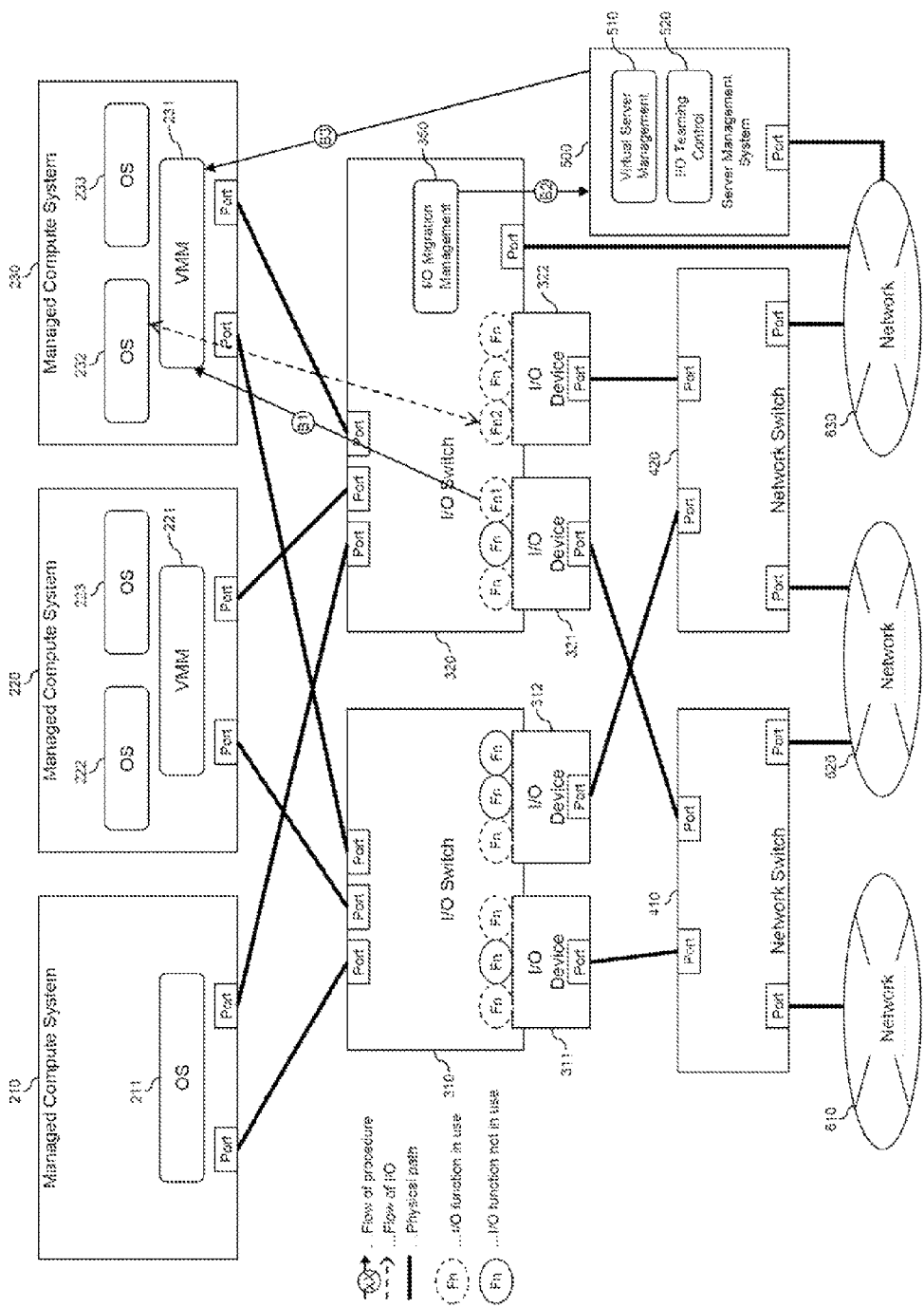
FIG. 11 shows an example of a system behavior in Hot-Remove flow of the I/O migration.

FIG. 11 shows an example of system behavior in Hot-Remove flow from step 1760 to step 1770. I/O migration management 350 makes I/O function for the connection migrated from, the I/O migration management 350 instructs the Hot-Remove to the VMM 231 (B1). Result check for the Hot-Remove step 1763 and teaming remove step 1772 are requested from the I/O migration management 350 to server management system 500 (B2). To execute these requests, the server management system 500 instructs to the OS and/or the VMM on managed compute system (B3).

Figure 12:
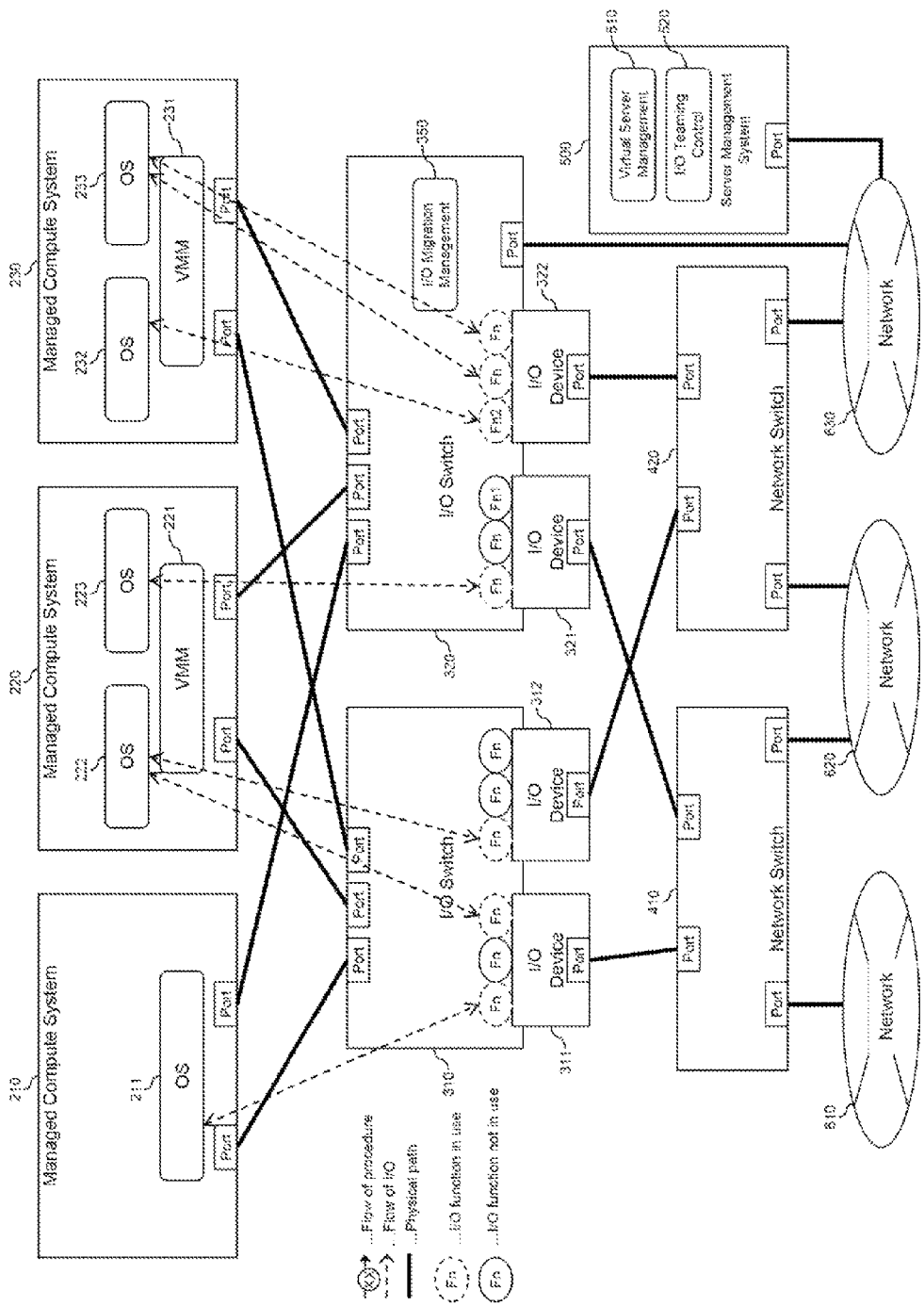
FIG. 12 shows an example of a system behavior after Hot-Remove flow of the I/O migration.

FIG. 12 shows an example of system state after Hot-Remove flow. The host's I/O connection had been migrated from the old I/O function Fn1 to the newly assigned I/O function Fn2, and the host can use the newly assigned I/O device 322 instead of the old I/O device 321.

The computers and storage systems implementing the invention can also have known drives (e.g., CD and DVD drives, floppy disk drives, hard drives, etc.) which can store and read the modules, programs and data structures used to implement the above-described invention. These modules, programs and data structures can be encoded on such computer-readable media. For example, the data structures of the invention can be stored on computer-readable media independently of one or more computer-readable media on which reside the programs used in the invention. The components of the system can be interconnected by any form or medium of digital data communication, e.g., a communication network. Examples of communication networks include local area networks, wide area networks, e.g., the Internet, wireless networks, storage area networks, and the like.

In the description, numerous details are set forth for purposes of explanation in order to provide a thorough understanding of the present invention. However, it will be apparent to one skilled in the art that not all of these specific details are required in order to practice the present invention. It is also noted that the invention may be described as a process, which is usually depicted as a flowchart, a flow diagram, a structure diagram, or a block diagram. Although a flowchart may describe the operations as a sequential process, many of the operations can be performed in parallel or concurrently. In addition, the order of the operations may be re-arranged.

As is known in the art, the operations described above can be performed by hardware, software, or some combination of software and hardware. Various aspects of embodiments of the invention may be implemented using circuits and logic devices (hardware), while other aspects may be implemented using instructions stored on a machine-readable medium (software), which if executed by a processor, would cause the processor to perform a method to carry out embodiments of the invention.

Furthermore, some embodiments of the invention may be performed solely in hardware, whereas other embodiments may be performed solely in software. Moreover, the various functions described can be performed in a single unit, or can be spread across a number of components in any number of ways. When performed by software, the methods may be executed by a processor, such as a general purpose computer, based on instructions stored on a computer-readable medium. If desired, the instructions can be stored on the medium in a compressed and/or encrypted format.

From the foregoing, it will be apparent that the invention provides methods, apparatuses and programs stored on computer readable media for I/O migrating management. Additionally, while specific embodiments have been illustrated and described in this specification, those of ordinary skill in the art appreciate that any arrangement that is calculated to achieve the same purpose may be substituted for the specific embodiments disclosed. This disclosure is intended to cover any and all adaptations or variations of the present invention, and it is to be understood that the terms used in the following claims should not be construed to limit the invention to the specific embodiments disclosed in the specification. Rather, the scope of the invention is to be determined entirely by the following claims, which are to be construed in accordance with the established doctrines of claim interpretation, along with the full range of equivalents to which such claims are entitled.

What is claimed is:

1. An information system for Input/Output (I/O) migration comprising:
   a managed computer executing an Operating System (OS);
   an I/O switch having plurality of I/O devices coupled with the managed computer via a network; and
   a migration management module, wherein the migration management module:
   detects a first I/O function associated with a first I/O device to which the OS is connected,
   selects a second I/O function associated with a second I/O device which is the same type of the first I/O device, and instructs to hot-add the second I/O function to the OS,
   wherein the OS:
   sets a teaming for a first virtual Media Access Control (MAC) address of a first virtual Network Interface Card (NIC) corresponding to the first I/O function and a second virtual MAC address of a second virtual NIC corresponding to the second I/O function after the hot-add of the second I/O function is completed, and
   disconnects the first virtual MAC address of the first virtual NIC corresponding to the first I/O function after the set of teaming for the first virtual MAC address and the second virtual MAC address is completed, in order to communicate via the second I/O device associated with the second I/O function instead of the first I/O device associated with the first I/O function.

2. The information system according to the claim 1, wherein the instruction to hot-add from the migration management module includes an interruption data having an information of the second I/O function to the OS.

3. The information system according to the claim 1, wherein the migration management module sends a request to check the result of the hot-add is completed or not to a server management computer, and the server management computer inquires the configuration of the managed computer and returns the result to the I/O migration management module.

4. The information system according to the claim 1, wherein the migration management module creates a third virtual MAC address on the OS, and sets the teaming among the third virtual MAC address, a first virtual MAC address of a first virtual NIC corresponding to the first I/O function and a second virtual MAC address of a second virtual NIC corresponding to the second I/O function.

5. The information system according to the claim 1, wherein the migration management module hot-removes the information of the first virtual MAC address of the first virtual NIC corresponding to the first I/O function from the setting of the teaming.

6. The information system according to the claim 1, wherein the I/O migration management computer selects a second I/O function associated with a second I/O device which is connected with the same network domain of the first I/O device.

7. The information system according to the claim 1, wherein the I/O function is the virtual NIC or virtual Host Bus Adapter (HBA).

8. The information system according to the claim 1, wherein the network is Peripheral Component Interconnect Express (PCI-e) network.

9. The information system according to the claim 1, wherein the I/O switch has the migration management module.

10. A method for Input/Output (I/O) migration of an information system, the information system having a managed computer executing an Operating System (OS), an I/O switch having plurality of I/O devices coupled with the managed computer via a network, and
    a migration management module, the method comprising:
    detecting a first I/O function associated with a first I/O device to which the OS is connected;
    selecting a second I/O function associated with a second I/O device which is the same type of the first I/O device;
    instructing to hot-add the second I/O function to the OS;
    setting a teaming for a first virtual Media Access Control (MAC) address of a first virtual Network Interface Card (NIC) corresponding to the first I/O function and a second virtual MAC address of a second virtual NIC corresponding to the second I/O function after the hot-add of the second I/O function is completed; and
    disconnecting the first virtual MAC address of the first virtual NIC corresponding to the first I/O function after the set of teaming for the first virtual MAC address and the second virtual MAC address is completed, in order to communicate via the second I/O device associated with the second I/O function instead of the first I/O device associated with the first I/O function.

11. The method according to the claim 10, wherein the instruction to hot-add includes an interruption data having an information of the second I/O function to the OS.

12. The method according to the claim 10, further comprising;
    sending a request to check the result of the hot-add is completed or not to a server management computer, and the server management computer inquires the configuration of the managed computer and returns the result to the I/O migration management module.

13. The method according to the claim 10, further comprising:

creating a third virtual MAC address on the OS, and setting the teaming among the third virtual MAC address, a first virtual MAC address of a first virtual NIC corresponding to the first I/O function and a second virtual MAC address of a second virtual NIC corresponding to the second I/O function.

14. The method according to the claim 10, further comprising:
hot-removing the information of the first virtual MAC address of the first virtual NIC corresponding to the first I/O function from the setting of the teaming.

15. The method according to the claim 10, further comprising:
selecting a second I/O function associated with a second I/O device which is connected with the same network domain of the first I/O device.

16. The method according to the claim 10,
wherein the I/O function is the virtual NIC or virtual Host Bus Adapter (HBA).

17. The method according to the claim 10,
wherein the network is Peripheral Component Interconnect Express (PCI-e) network.

18. The method according to the claim 10,
wherein the I/O switch has the migration management module.

* * * * *